United States Patent
Kwon

(10) Patent No.: US 12,216,957 B2
(45) Date of Patent: Feb. 4, 2025

(54) TILED DISPLAY DEVICE

(71) Applicant: Samsung Display Co., LTD., Yongin-si (KR)

(72) Inventor: So Young Kwon, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/964,417

(22) Filed: Oct. 12, 2022

(65) Prior Publication Data

US 2023/0266937 A1  Aug. 24, 2023

(30) Foreign Application Priority Data

Feb. 24, 2022  (KR) .................. 10-2022-0024465

(51) Int. Cl.
*G06F 3/14* (2006.01)
*G09G 3/32* (2016.01)

(52) U.S. Cl.
CPC ............. *G06F 3/1446* (2013.01); *G09G 3/32* (2013.01); *G09G 2300/026* (2013.01); *G09G 2320/0626* (2013.01)

(58) Field of Classification Search
CPC ......... G06F 3/1446; G06F 3/147; G09G 3/32; G09G 2300/026; G09G 2320/0626; G09G 2320/0233; H04N 19/176; H04N 9/3147; G02B 27/0172; G09F 9/3026; G09F 9/3023; G09F 13/04; G09F 19/226
See application file for complete search history.

(56) References Cited

U.S. PATENT DOCUMENTS

| | | | |
|---|---|---|---|
| 6,115,092 A * | 9/2000 | Greene | G09G 3/20 345/903 |
| 6,999,045 B2 | 2/2006 | Cok | |
| 2008/0284675 A1* | 11/2008 | Perkins | G06F 3/1446 345/1.3 |
| 2011/0102300 A1* | 5/2011 | Wood | H04N 9/3147 345/1.3 |
| 2017/0169794 A1* | 6/2017 | Nagano | G09G 5/02 |
| 2020/0090375 A1* | 3/2020 | Mori | G02B 27/01 |
| 2020/0241828 A1* | 7/2020 | Noyelle | G09G 3/3208 |
| 2021/0132693 A1* | 5/2021 | Pulli | H04N 13/398 |
| 2022/0024492 A1* | 1/2022 | Panttila | B60W 60/0016 |
| 2023/0110027 A1* | 4/2023 | Bajpayee | B60W 30/09 701/301 |

FOREIGN PATENT DOCUMENTS

| | | |
|---|---|---|
| CN | 107767839 | 3/2018 |
| JP | 5761359 | 8/2015 |
| KR | 10-2018-0015553 | 2/2018 |

* cited by examiner

*Primary Examiner* — Matthew A Eason
*Assistant Examiner* — Sujit Shah
(74) *Attorney, Agent, or Firm* — KILE PARK REED & HOUTTEMAN PLLC

(57) ABSTRACT

A tiled display device comprises a first display device and a second display device, each including a display area including pixels and a non-display area adjacent to the display area, a coupling area disposed between the first display device and the second display device, a viewing distance detector detecting a viewing distance between the tiled display device and a user, and a luminance compensator compensating luminance of the pixels adjacent to the coupling area based on a size of the coupling area and the viewing distance.

11 Claims, 14 Drawing Sheets

FIG. 12
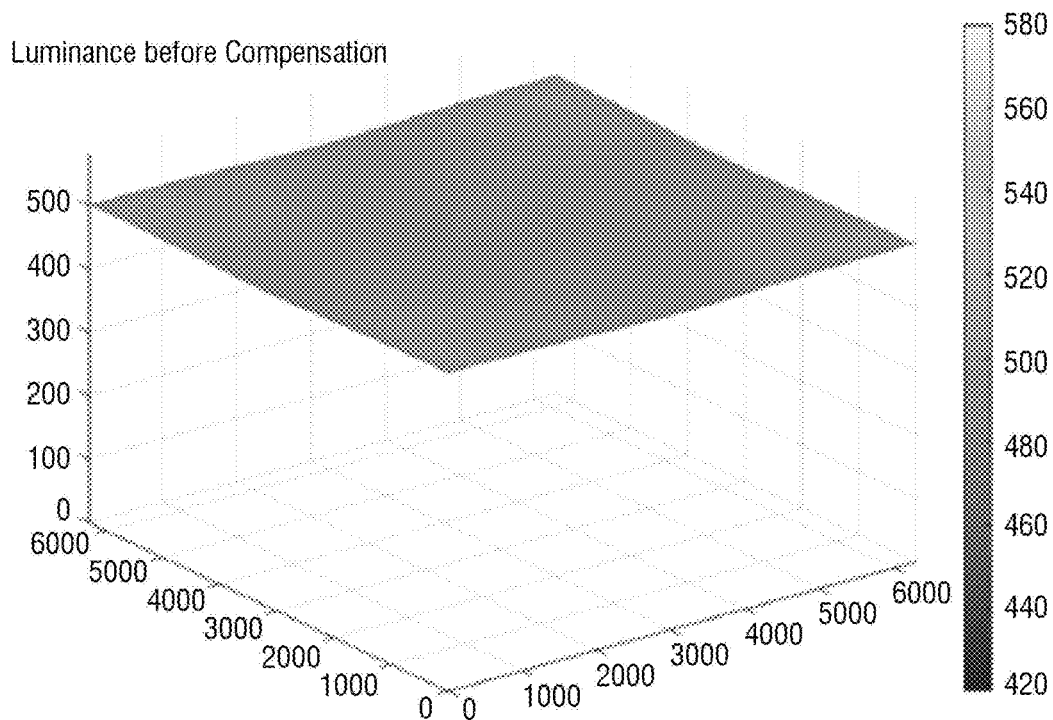
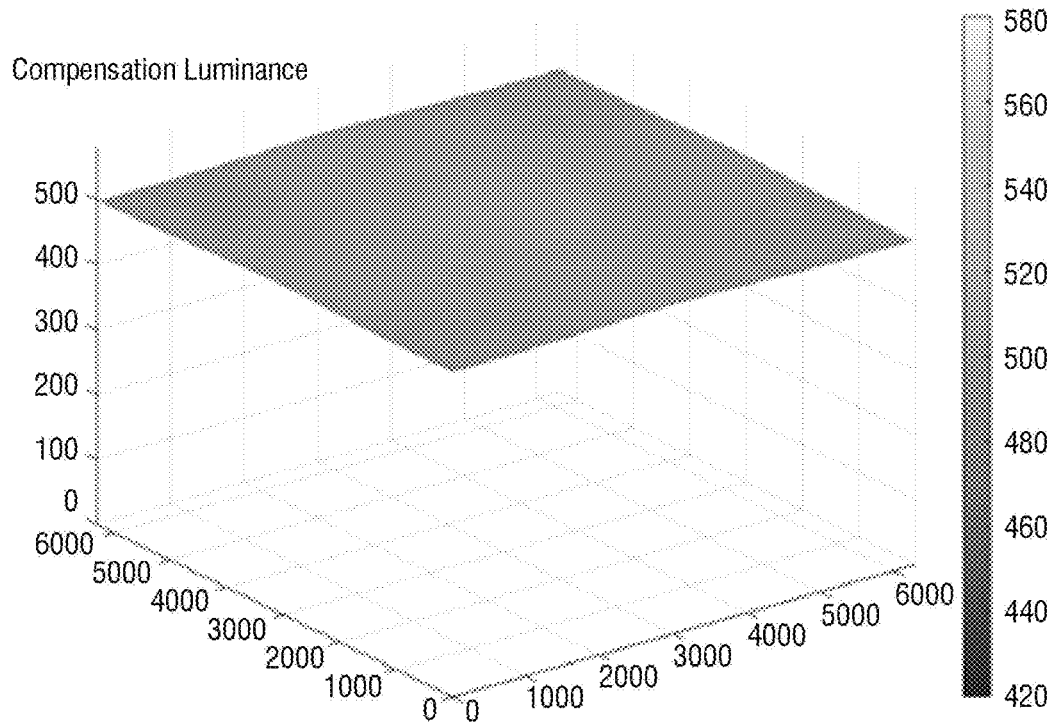

FIG. 13
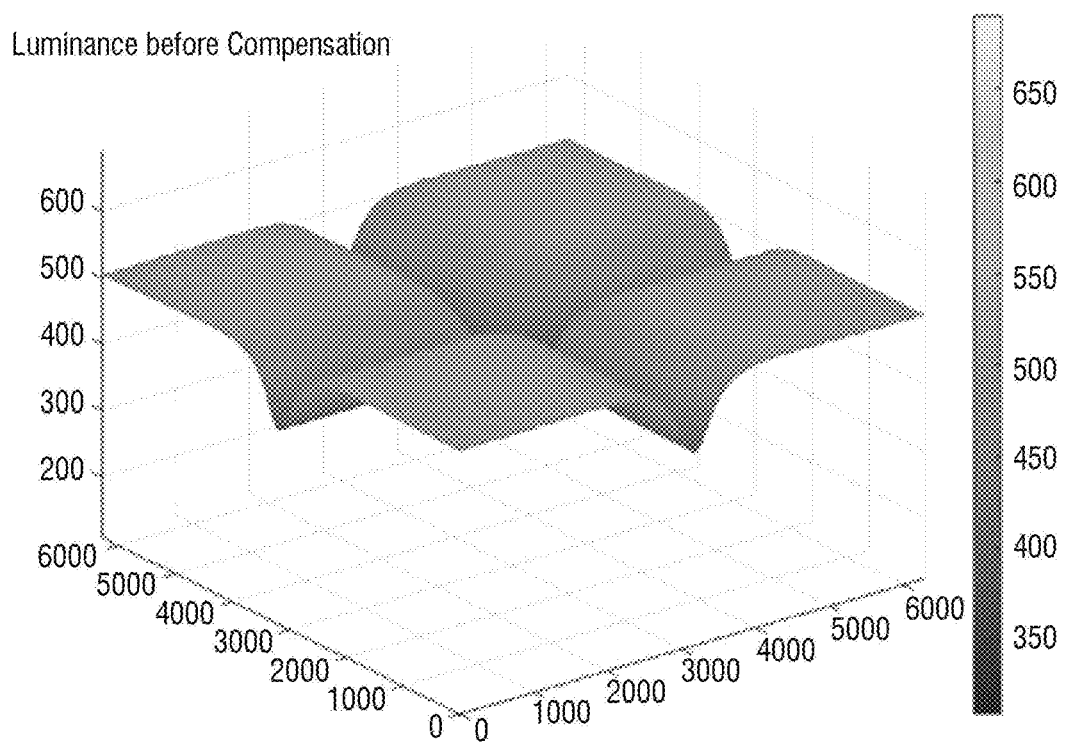
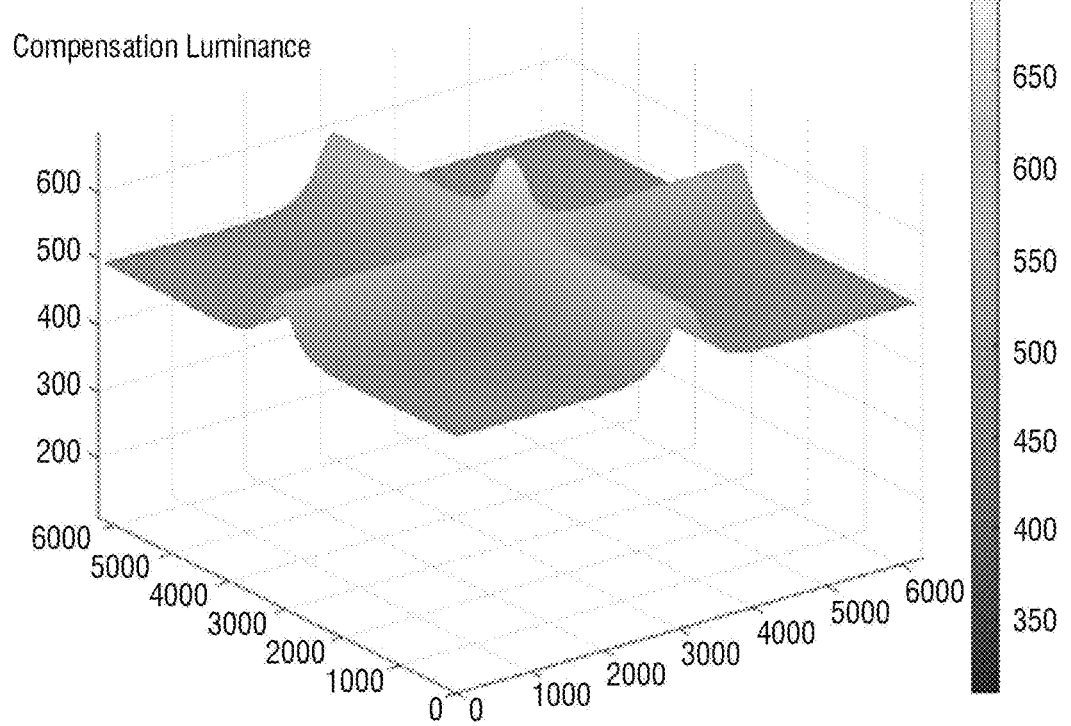

TILED DISPLAY DEVICE

CROSS-REFERENCE TO RELATED APPLICATION

This application claims priority to and benefit of Korean Patent Application No. 10-2022-0024465 under 35 U.S.C. 119, filed on Feb. 24, 2022, in the Korean Intellectual Property Office (KIPO), the contents of which are incorporated by reference in its entirety.

BACKGROUND

1. Technical Field

The disclosure relates to a tiled display device.

2. Description of the Related Art

When a display device is manufactured in a large size, a defective rate of light emitting elements may increase due to an increase in the number of pixels, and productivity or reliability may decrease. In order to solve such a problem, a tiled display device may realize a screen having a large size by connecting multiple display devices having a relatively small size to each other. The tiled display device may include boundary portions called seams between the display devices due to non-display areas or bezel areas of each of the display devices adjacent to each other. When one image is displayed on the entire screen, the boundary portions between the display devices may give a sense of discontinuity to the entire screen to decrease a degree of immersion of the image.

SUMMARY

Aspects of the disclosure also provide a tiled display device capable of preventing boundary portions between or non-display areas of display devices from being recognized, removing a sense of discontinuity between the display devices, and improving a degree of immersion of an image by compensating luminance of pixels adjacent to coupling areas.

However, aspects of the disclosure are not restricted to those set forth herein. The above and other aspects of the disclosure will become more apparent to one of ordinary skill in the art to which the disclosure pertains by referencing the detailed description of the disclosure given below.

According to an embodiment of the disclosure, a tiled display device may include a first display device and a second display device, each including a display area including pixels and a non-display area adjacent to the display area, a coupling area disposed between the first display device and the second display device, a viewing distance detector detecting a viewing distance between the tiled display device and a user, and a luminance compensator compensating luminance of the pixels adjacent to the coupling area based on a size of the coupling area and the viewing distance.

The luminance compensator may calculate a visibility index based on the size of the coupling area and the viewing distance, and the luminance compensator may determine a luminance compensation amount for optimizing the visibility index.

In case that the luminance compensation amount has a specific value, the luminance compensator may calculate a visibility index that changes depending on the viewing distance, and the luminance compensator may determine a range of the viewing distance in which the visibility index satisfies a reference index.

The luminance compensator may determine the luminance compensation amount based on a selection of the user within the range of the viewing distance in which the visibility index satisfies the reference index.

The luminance compensator may increase a number of the pixels of which the luminance is to be compensated in case that a luminance compensation amount increases.

The size of the coupling area may be determined by comparing a coupling pitch and a pixel pitch. The coupling pitch may be a pitch between a pixel of the first display device adjacent to the coupling area and a pixel of the second display device adjacent to the coupling area. The pixel pitch may be a pitch between adjacent ones of the pixels in the second display device.

An increment in a luminance compensation amount of the pixels adjacent to the coupling area may be determined based on a difference between the coupling pitch and the pixel pitch in case that the coupling pitch is greater than the pixel pitch, and a decrement in the luminance compensation amount of the pixels adjacent to the coupling area may be determined based on a difference between the pixel pitch and the coupling pitch in case that the coupling pitch is smaller than the pixel pitch.

The luminance compensator may not compensate the pixels adjacent to the coupling area in case that the coupling pitch and the pixel pitch are substantially equal to each other.

The viewing distance detector may detect the viewing distance by performing a foveated rendering based on a position of the user.

According to an embodiment of the disclosure, a tiled display device may include a first display device and a second display device, each including a display area including pixels and a non-display area adjacent to the display area, a coupling area disposed between the first display device and the second display device, a viewing distance detector detecting a viewing distance between the tiled display device and a user, an illuminance detector detecting illuminance of the coupling area, and a luminance compensator compensating luminance of the pixels adjacent to the coupling area based on a size of the coupling area, the viewing distance, and the illuminance.

The luminance compensator may calculate a visibility index based on the size of the coupling area, the viewing distance, and the illuminance, and the luminance compensator may determine a luminance compensation amount for optimizing the visibility index.

In case that each of the luminance compensation amount and the illuminance has a specific value, the luminance compensator may calculate a visibility index that changes depending on the viewing distance, and the luminance compensator may determine a range of the viewing distance in which the visibility index satisfies a reference index.

The luminance compensator may determine the luminance compensation amount based on a selection of the user within the range of the viewing distance in which the visibility index satisfies the reference index.

The luminance compensator may decrease a luminance compensation amount of the pixels adjacent to the coupling area in case that the illuminance increases.

The luminance compensator may compensate the luminance of the pixels adjacent to the coupling area based on the size of the coupling area and the viewing distance in case that the illuminance is equal to or less than a level.

The luminance compensator may increase a number of the pixels of which the luminance is to be compensated in case that a luminance compensation amount increases.

The size of the coupling area may be determined by comparing a coupling pitch and a pixel pitch. The coupling pitch may be a pitch between a pixel of the first display device adjacent to the coupling area and a pixel of the second display device adjacent to the coupling area. The pixel pitch may be a pitch between adjacent ones of the pixels in the second display device.

An increment in a luminance compensation amount of the pixels adjacent to the coupling area may be determined based on a difference between the coupling pitch and the pixel pitch in case that the coupling pitch is greater than the pixel pitch, and a decrement in the luminance compensation amount of the pixels adjacent to the coupling area may be determined based on a difference between the pixel pitch and the coupling pitch in case that the coupling pitch is smaller than the pixel pitch.

The luminance compensator may not compensate the pixels adjacent to the coupling area in case that the coupling pitch and the pixel pitch are substantially equal to each other.

The viewing distance detector may detect the viewing distance by performing a foveated rendering based on a position of the user.

With a tiled display device according to embodiments, by compensating luminance of unit pixels adjacent to the coupling area based on a size of the coupling area, a viewing distance, and illuminance, it is possible to prevent a user from recognizing coupling areas between multiple display devices and remove a sense of discontinuity between the display devices to improve a degree of immersion of an image.

The effects of the disclosure are not limited to the aforementioned effects, and various other effects are included in the specification.

BRIEF DESCRIPTION OF THE DRAWINGS

The above and other aspects and features of the disclosure will become more apparent by describing in detail embodiments thereof with reference to the attached drawings, in which:

FIGS. 11 to 14 are graphs illustrating luminance before compensation and compensated luminance according to a size of a coupling area and a viewing distance in the tiled display device according to an embodiment.

DETAILED DESCRIPTION OF THE EMBODIMENTS

Figure 1:
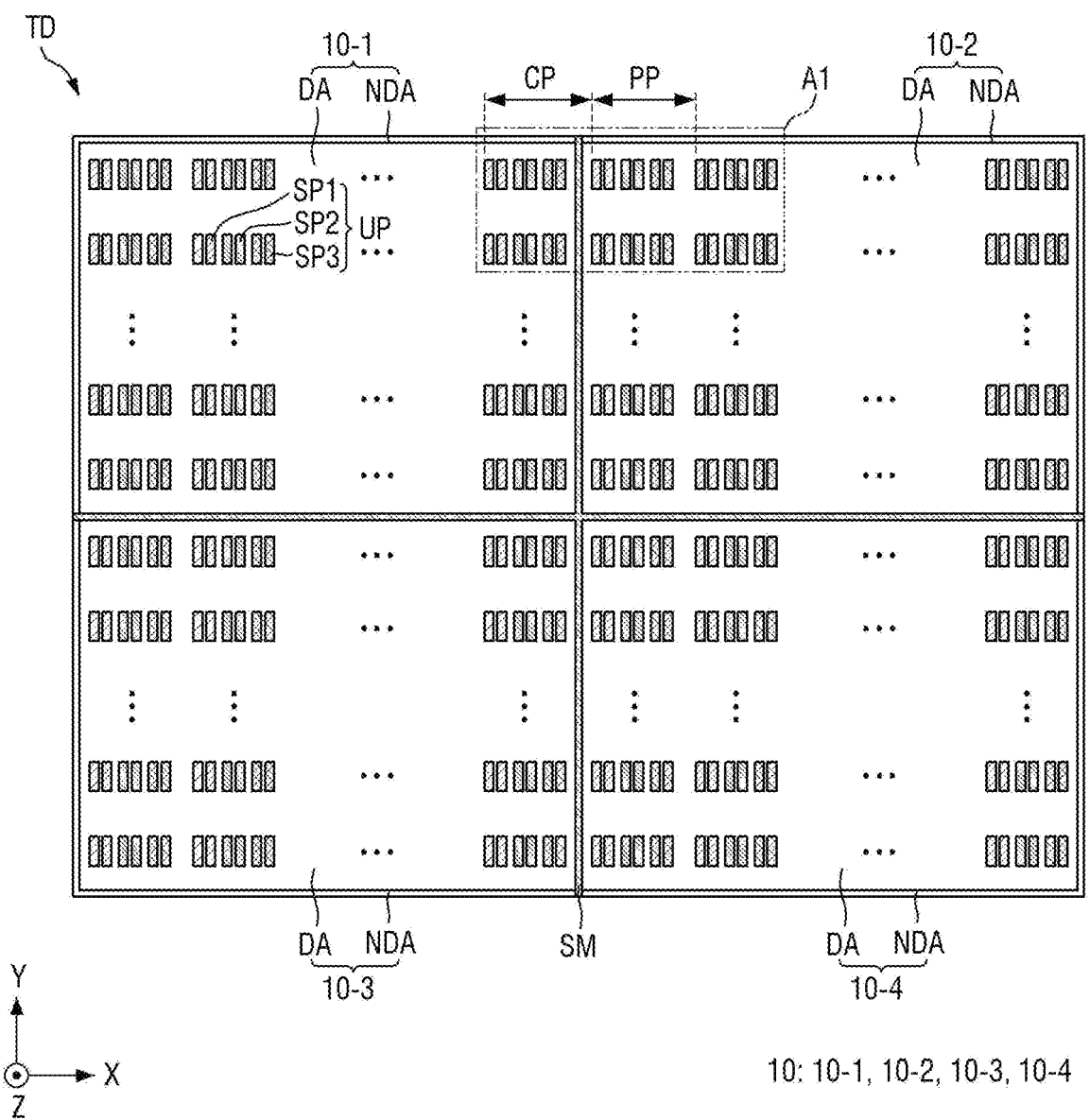
FIG. 1 is a plan view illustrating a tiled display device according to an embodiment.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. In some instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in other embodiments without departing from the disclosure.

Unless otherwise specified, the illustrated embodiments are to be understood as providing features of varying detail of some ways in which the disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on", "connected to", or "coupled to" another element or layer, it may be directly on, connected to, or coupled to the other element or layer or intervening elements or layers may be present. When, however, an element or layer is referred to as being "directly on", "directly connected to", or "directly coupled to" another element or layer, there are no intervening elements or layers present. To this end, the term "connected" may refer to physical, electrical, and/or fluid connection, with or without intervening elements.

Further, the X-axis, the Y-axis, and the Z-axis are not limited to three axes of a rectangular coordinate system, and thus the X-, Y-, and Z-axes, and may be interpreted in a broader sense. For example, the X-axis, the Y-axis, and the Z-axis may be perpendicular to one another, or may represent different directions that are not perpendicular to one another.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

Although the terms "first", "second", and the like may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath", "below", "under", "lower", "above", "upper", "over", "higher", "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a", "an", and "the" are intended to include the plural forms as well, unless the context clearly indicates otherwise. Moreover, the terms "comprises", "comprising", "includes", and/or "including", when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially", "about", and other similar terms, are used as terms of approximation, not as terms of degree, and thus are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature, and the shapes of these regions may not reflect actual shapes of regions of a device and are not necessarily intended to be limiting.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

Unless otherwise defined or implied herein, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or overly formal sense, unless clearly so defined herein.

Hereinafter, detailed embodiments of the disclosure will be described with reference to the accompanying drawings.

Figure 2:
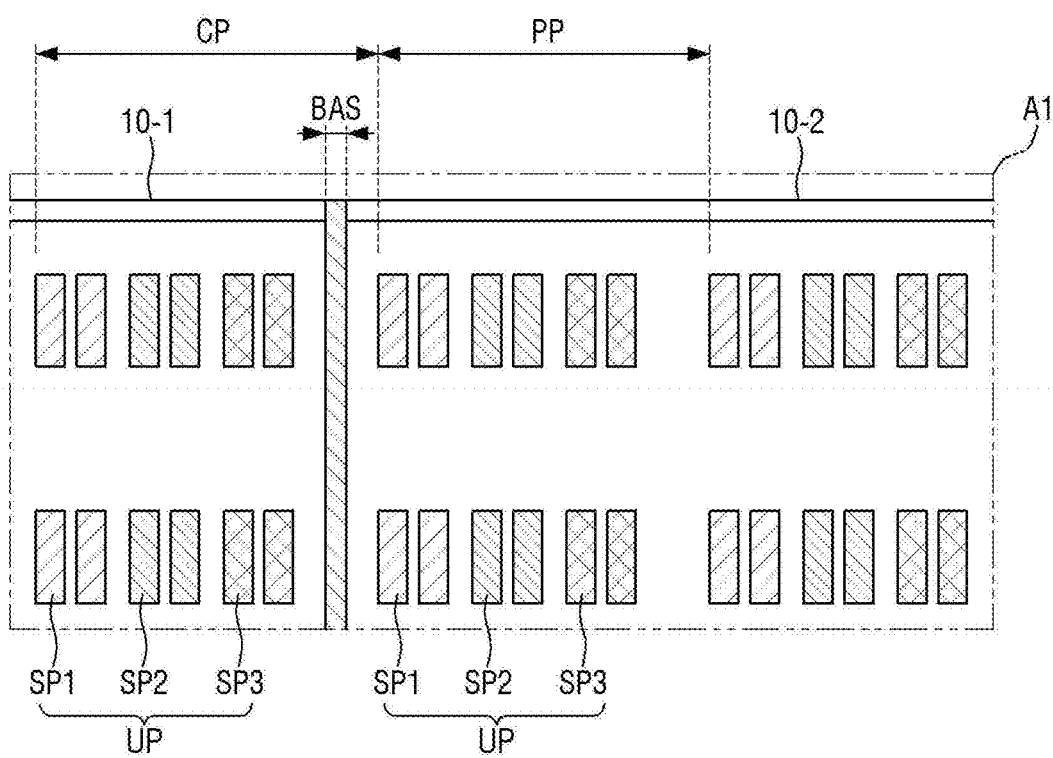
FIG. 2 is an enlarged view of area A1 of FIG. 1.

FIG. 1 is a plan view illustrating a tiled display device according to an embodiment, and FIG. 2 is an enlarged view of area A1 of FIG. 1.

Referring to FIGS. 1 and 2, a tiled display device TD may include multiple display devices 10. The display devices 10 may be arranged in a lattice, but are not limited thereto. The display devices 10 may be connected to each other in a first direction (X-axis direction) and/or a second direction (Y-axis direction), and the tiled display device TD may have a specific shape. In an embodiment, the display devices 10 may have the same size, but are not limited thereto. In another embodiment, the display devices 10 may have different sizes.

The tiled display device TD may include first to fourth display devices 10-1 to 10-4. The number of display devices 10 and a coupling relationship between the display devices 10 are not limited to the embodiment of FIG. 1. The number of display devices 10 may be determined based on sizes of each of the display devices 10 and the size of the tiled display device TD.

Each of the display devices 10 may have a rectangular shape including long sides and short sides. The display devices 10 may have long sides and/or short sides connected to each other. Some display devices 10 may be disposed at edges of the tiled display device TD, and may form one side of the tiled display device TD. Some other display devices 10 may be disposed at corners of the tiled display device TD, and may form two adjacent sides of the tiled display device TD. Some other display devices 10 may be disposed inside the tiled display device TD, and be surrounded by other display devices 10.

Each of the display devices 10 may include a display area DA and a non-display area NDA. The display area DA may include multiple unit pixels UP to display an image. Each of the unit pixels UP may include first to third pixels SP1, SP2, and SP3, but is not limited thereto. Each of the first to third pixels SP1, SP2, and SP3 may include an organic light emitting diode including an organic light emitting layer, a quantum dot light emitting diode including a quantum dot light emitting layer, an inorganic light emitting diode including an inorganic semiconductor, or a micro light emitting diode. The non-display area NDA may be disposed adjacent to the display area DA to surround the display area DA, and may not display an image.

The unit pixels UP may be arranged in multiple rows and columns in the display area DA. Each of the first to third pixels SP1, SP2, and SP3 may include an emission area or an opening area defined by a pixel defining film or a bank, and may emit light having a predetermined (or selectable) peak wavelength through the emission area or the opening area. The emission area may be an area in which light generated by light emitting elements of the display device 10 is emitted to the outside of the display device 10. The first pixel SP1 may emit light of a first color, the second pixel SP2 may emit light of a second color, and the third pixel SP3 may emit light of a third color. For example, the light of the first color may be red light having a peak wavelength in the range of about 610 nm to about 650 nm, the light of the second color may be green light having a peak wavelength in the range of about 510 nm to about 550 nm, and the light of the third color may be blue light having a peak wavelength in the range of about 440 nm to about 480 nm, but the disclosure is not limited thereto.

The first to third pixels SP1, SP2, and SP3 may be sequentially and repeatedly disposed in the first direction (X-axis direction) of the display area DA. In an embodiment, areas of the emission areas of the first to third pixels SP1, SP2, and SP3 may be substantially the same as each other, but are not limited thereto. In another embodiment, areas of the emission areas of the first to third pixels SP1, SP2, and SP3 may be different from each other.

The tiled display device TD may have an overall planar shape, but is not limited thereto. The tiled display device TD may have a three-dimensional shape to provide a three-dimensional effect to a user. In an embodiment, in case that the tiled display device TD has a three-dimensional shape, at least some of the display devices 10 may have a curved shape. In another embodiment, the display devices 10 have a planar shape and are connected to each other at an angle, such that the tiled display device TD may have a three-dimensional shape.

The tiled display device TD may include coupling areas SM disposed between the display areas DA. The tiled display device TD may be formed by connecting the non-display areas NDA of adjacent display devices 10 to each other. The display devices 10 may be connected to each other by coupling members or adhesive members disposed in the coupling areas SM. The coupling area SM of each of the display devices 10 may not include pad parts or flexible films attached to the pad parts. A distance between the display areas DA of the display devices 10 may be too small for the coupling areas SM between the display devices 10 to be recognized by the user. A size BAS of the coupling area SM may correspond to a difference between a coupling pitch CP and a pixel pitch PP. For example, the coupling pitch CP may correspond to a pitch between a unit pixel UP disposed on the right side of a first display device 10-1 and a unit pixel UP disposed on the left side of a second display device 10-2, and the pixel pitch PP may correspond to a pitch between adjacent unit pixels UP of the second display device 10-2. Accordingly, the tiled display device TD may remove a sense of discontinuity between the display devices 10 and improve a degree of immersion of an image by preventing the coupling areas SM between the display devices 10 from being recognized by the user.

Figure 3:
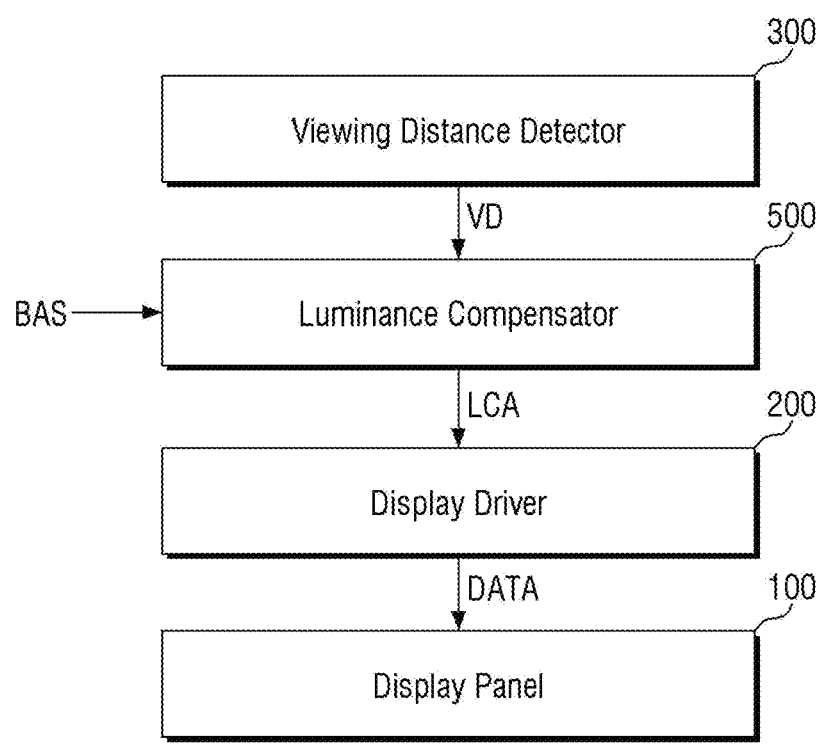
FIG. 3 is a block diagram illustrating a display panel, a display driver, a viewing distance detector, and a luminance compensator of the tiled display device according to an embodiment.

FIG. 3 is a block diagram illustrating a display panel, a display driver, a viewing distance detector, and a luminance compensator of the tiled display device according to an embodiment.

Referring to FIG. 3, the tiled display device TD may include a display panel 100, a display driver 200, a viewing distance detector 300, and a luminance compensator 500.

Each of the display devices 10 may include a display panel 100. The display panel 100 may include a display area DA and a non-display area NDA. The display area DA may include multiple unit pixels UP to display an image. Each of the unit pixels UP may include first to third pixels SP1, SP2, and SP3. The non-display area NDA may be disposed adjacent to the display area DA to surround the display area DA, and may not display an image.

The display driver 200 may output signals and voltages for driving the first to third pixels SP1, SP2, and SP3. The display driver 200 may supply data voltages to data lines of the display panel 100. The data voltages may be supplied to the first to third pixels SP1, SP2, and SP3, and may determine luminance of the first to third pixels SP1, SP2, and SP3. The display driver 200 may supply a source voltage to a power line of the display panel 100, and may supply a gate control signal to a gate driver of the display panel 100. For example, the display driver 200 may be formed as an integrated circuit (IC) and may be mounted in a chip on film manner or a tape carrier package manner, but is not limited thereto.

The viewing distance detector 300 may detect a viewing distance VD from the user. The viewing distance detector 300 may include an eye tracker to track user's eyes, thereby detecting a position of the user. The viewing distance detector 300 may detect the viewing distance VD between the tiled display device TD and the user by performing a foveated rendering based on the position of the user. A method of detecting the position of the user and a method of detecting the viewing distance VD are not limited to those described above. The viewing distance detector 300 may supply the detected viewing distance VD to the luminance compensator 500.

The luminance compensator 500 may receive the size BAS of the coupling area SM and the viewing distance VD. The size BAS of the coupling area SM may be calculated by comparing the coupling pitch CP and the pixel pitch PP with each other after the display devices 10 are connected to each other. For example, the coupling pitch CP may correspond to a pitch between a unit pixel UP disposed on the right side of a first display device 10-1 and a unit pixel UP disposed on the left side of a second display device 10-2, and the pixel pitch PP may correspond to a pitch between adjacent unit pixels UP of the second display device 10-2. Accordingly, as the coupling pitch CP becomes greater than the pixel pitch PP, the size BAS of the coupling area SM may increase. The size BAS of the coupling area SM may be measured and stored in a memory after the display devices 10 are connected to each other, and the luminance compensator 500 may receive the size BAS of the coupling area SM in a luminance compensation process.

The luminance compensator 500 may increase a luminance compensation amount LCA of the unit pixels UP adjacent to the coupling area SM as the coupling pitch CP becomes greater than the pixel pitch PP, and decrease the luminance compensation amount LCA as the coupling pitch CP becomes smaller than the pixel pitch PP. The luminance compensator 500 may not compensate the luminance of the unit pixels UP adjacent to the coupling area SM (for example, compensate the luminance of the unit pixels UP adjacent to the coupling area SM for a luminance compensation amount) in case that the coupling pitch CP and the pixel pitch PP are the same as each other. Accordingly, the luminance compensator 500 may end the luminance compensation process in case that the coupling pitch CP and the pixel pitch PP are the same as each other.

The luminance compensator 500 may compensate the luminance of the unit pixels UP adjacent to the coupling area SM based on the size BAS of the coupling area SM and the viewing distance VD. For example, the luminance compensator 500 may calculate a visibility index through a simulation of a human vision system (HVS) based on the size BAS of the coupling area SM and the viewing distance VD. The human vision system HVS may indicate a degree of which the coupling area SM is recognized by the user based on the size BAS of the coupling area SM and the viewing distance VD by the visibility index. The human vision system (HVS) may use a characteristic function of the user's eyes or a characteristic function of the tiled display device TD. The human vision system (HVS) may use at least one of a phase transfer function, a modulation transfer function, a light transfer function, a line spread function, a pupil function, and a point spread function as the characteristic function. A unit of the visibility index may be a just noticeable difference (JND).

The luminance compensator 500 may calculate the visibility index based on the size BAS of the coupling area SM and the viewing distance VD and may determine a luminance compensation amount LCA for optimizing the visibility index. The luminance compensator 500 may adjust luminance adjacent to the coupling area SM to an average luminance level of the display area DA by compensating the luminance of the unit pixels UP adjacent to the coupling area SM. The luminance compensator 500 may decrease the visibility index by determining an optimal luminance compensation amount LCA. As the visibility index becomes lower, the coupling area SM may become harder to be recognized by the user, and a sense of discontinuity between the display devices 10 may be reduced to improve a degree of immersion of the image. The luminance compensation amount LCA may correspond to a compensation value added to an existing data voltage in order to minimize the visibility index.

The luminance compensator 500 may compensate the luminance of unit pixels UP disposed in a column or a row most adjacent to the coupling area SM. Referring to FIG. 1, the luminance compensator 500 may compensate the luminance of the unit pixels UP disposed in the rightmost column and the lowermost row of the first display device 10-1. The luminance compensator 500 may compensate the luminance of unit pixels UP disposed in the leftmost column and the lowermost row of the second display device 10-2. The luminance compensator 500 may compensate the luminance of unit pixels UP disposed in the rightmost column and the uppermost row of the third display device 10-3. The luminance compensator 500 may compensate the luminance of unit pixels UP disposed in the leftmost column and the uppermost row of the fourth display device 10-4. For example, the luminance compensator 500 may increase the number of unit pixels UP of which the luminance is to be compensated for as the luminance compensation amount LCA increases. The luminance compensator 500 may compensate the luminance of unit pixels UP disposed in at least one column or at least one row adjacent to the coupling area SM.

In case that the luminance compensation amount LCA has a specific value, the luminance compensator 500 may calculate a visibility index that changes depending on the viewing distance VD and may decide a range of the viewing distance VD in which the visibility index satisfies a reference index. Here, the reference index may define a degree of which the coupling area SM is not recognized by the user. For example, in case that the luminance compensation amount LCA is 1%, the luminance compensator 500 may calculate a visibility index that changes depending on the size BAS of the coupling area SM and the viewing distance VD, and may decide a range of the size BAS of the coupling area SM and/or the viewing distance VD in which the visibility index satisfies a reference index. The size BAS of the coupling area SM may be measured after the tiled display device TD is manufactured. Accordingly, the luminance compensator 500 may determine the luminance compensation amount LCA based on a selection of the user within the range of the viewing distance VD in which the visibility index satisfies the reference index based on the measured size BAS of the coupling area SM.

The luminance compensator 500 may provide the determined luminance compensation amount LCA to the display driver 200. The display driver 200 may generate compensation data DATA to be added to an existing data voltage based on the luminance compensation amount LCA. The display driver 200 may generate the compensation data DATA by adjusting the existing data voltage by a ratio of the luminance compensation amount LCA. The display driver 200 may transmit the compensation data DATA to the unit pixels UP adjacent to the coupling area SM of the display panel 100.

Figure 4:
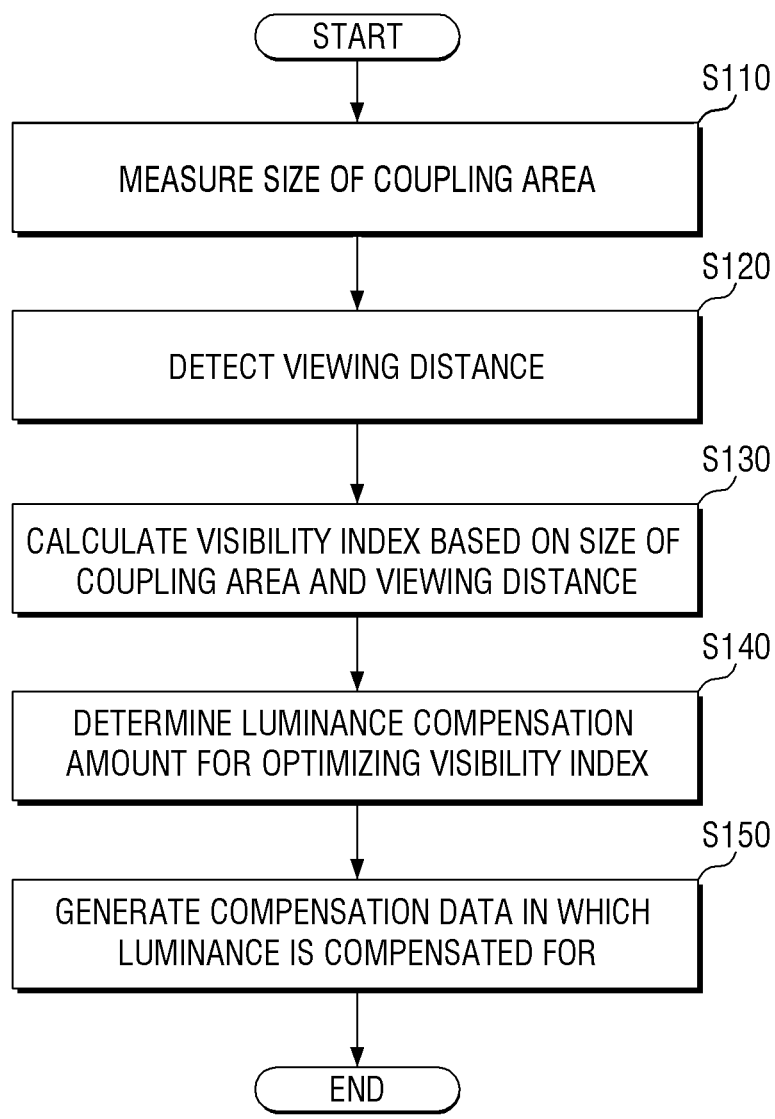
FIG. 4 is a flowchart illustrating a luminance compensation process of the tiled display device according to an embodiment.

FIG. 4 is a flowchart illustrating a luminance compensation process of the tiled display device according to an embodiment.

Referring to FIG. 4, a size BAS of the coupling area SM may be calculated by comparing the coupling pitch CP and the pixel pitch PP with each other after the display devices 10 are connected to each other (S110). The size BAS of the coupling area SM may be measured and stored in the memory after the display devices 10 are connected to each other.

The viewing distance detector 300 may detect the viewing distance VD from the user (S120). The viewing distance detector 300 may include the eye tracker to track the user's eyes, thereby detecting the position of the user. The viewing distance detector 300 may detect the viewing distance VD between the tiled display device TD and the user by performing the foveated rendering based on the position of the user.

The luminance compensator 500 may calculate the visibility index based on the size BAS of the coupling area SM and the viewing distance VD (S130). For example, the luminance compensator 500 may calculate the visibility index through the simulation of the human vision system (HVS) based on the size BAS of the coupling area SM and the viewing distance VD. The human vision system (HVS) may use the characteristic function of the user's eyes or the characteristic function of the tiled display device TD. The human vision system (HVS) may use at least one of the phase transfer function, the modulation transfer function, the light transfer function, the line spread function, the pupil function, and the point spread function as the characteristic function.

The luminance compensator 500 may determine the luminance compensation amount LCA for optimizing the visibility index (S140). The luminance compensator 500 may compensate the luminance of the unit pixels UP disposed in at least one column or at least one row adjacent to the coupling area SM. The luminance compensator 500 may adjust the luminance adjacent to the coupling area SM to the average luminance level of the display area DA by compensating the luminance of the unit pixels UP adjacent to the coupling area SM.

The luminance compensator 500 may provide the determined luminance compensation amount LCA to the display driver 200. The display driver 200 may generate the compensation data DATA to be added to the existing data voltage based on the luminance compensation amount LCA (S150). The display driver 200 may supply the compensation data DATA to the unit pixels UP adjacent to the coupling area SM of the display panel 100.

Figure 5:
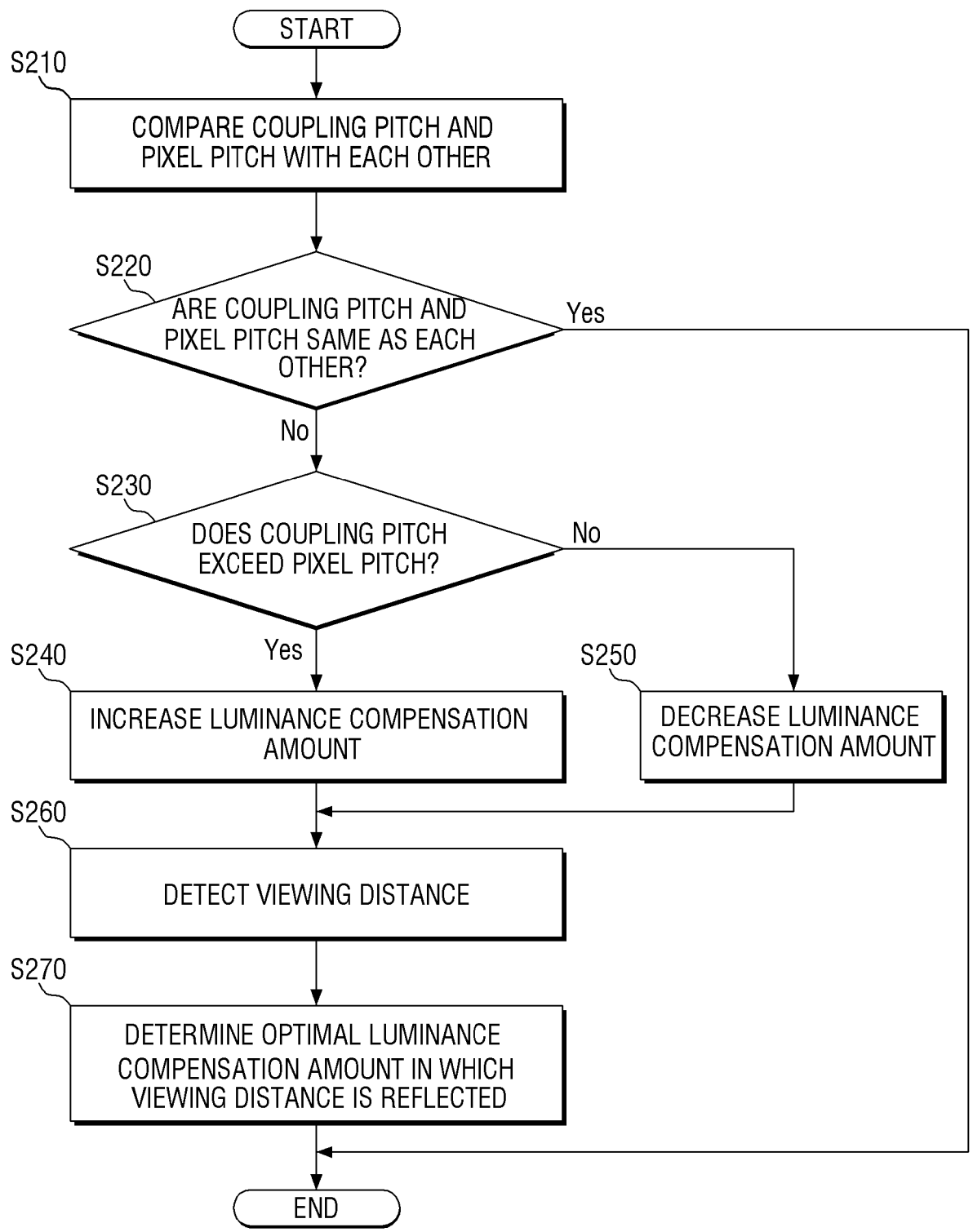
FIG. 5 is a flowchart illustrating a luminance compensation process of the tiled display device according to an embodiment.

FIG. 5 is a flowchart illustrating a luminance compensation process of the tiled display device according to an embodiment.

Referring to FIG. 5, the size BAS of the coupling area SM may be calculated by comparing the coupling pitch CP and the pixel pitch PP with each other after the display devices 10 are connected to each other (S210).

In case that the coupling pitch CP and the pixel pitch PP are the same as each other (S220), the luminance compensator 500 may not compensate the luminance of the unit pixels UP adjacent to the coupling area SM. Accordingly, the luminance compensator 500 may end the luminance compensation process in case that the coupling pitch CP and the pixel pitch PP are the same as each other.

In case that the coupling pitch CP is greater than the pixel pitch PP (S230), the luminance compensator 500 may increase the luminance compensation amount LCA of the unit pixels UP adjacent to the coupling area SM (S240).

In case that the coupling pitch CP is less than the pixel pitch PP, the luminance compensator 500 may decrease the luminance compensation amount LCA (S250).

The viewing distance detector 300 may detect the viewing distance VD from the user (S260).

The luminance compensator 500 may determine an optimal luminance compensation amount LCA in which the viewing distance VD is reflected (S270). The luminance compensator 500 may compensate the luminance of the unit pixels UP disposed in at least one column or at least one row adjacent to the coupling area SM. The luminance compensator 500 may adjust the luminance adjacent to the coupling area SM to the average luminance level of the display area DA by compensating the luminance of the unit pixels UP adjacent to the coupling area SM. The luminance compensator 500 may provide the determined luminance compensation amount LCA to the display driver 200. The display driver 200 may generate the compensation data DATA to be added to the existing data voltage based on the luminance compensation amount LCA.

Figure 6:
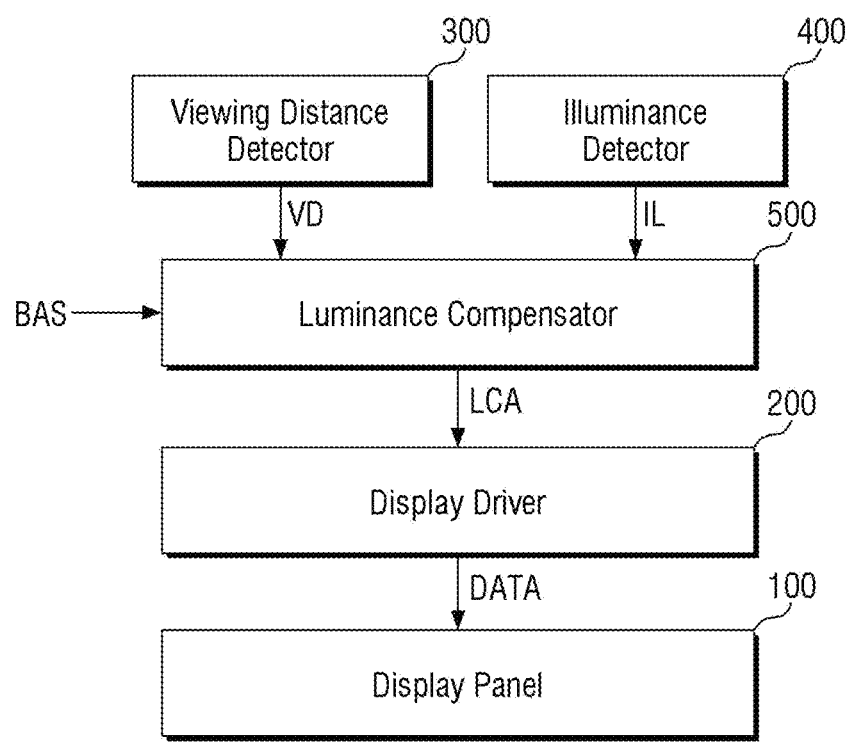
FIG. 6 is a block diagram illustrating a display panel, a display driver, a viewing distance detector, an illuminance detector, and a luminance compensator of a tiled display device according to another embodiment.

FIG. 6 is a block diagram illustrating a display panel, a display driver, a viewing distance detector, an illuminance detector, and a luminance compensator of a tiled display device according to another embodiment.

Referring to FIG. 6, the tiled display device TD may include a display panel 100, a display driver 200, a viewing distance detector 300, an illuminance detector 400, and a luminance compensator 500.

Each of the display devices 10 may include a display panel 100. The display panel 100 may include a display area DA and a non-display area NDA. The display area DA may include multiple unit pixels UP to display an image. Each of the unit pixels UP may include first to third pixels SP1, SP2, and SP3, but is not limited thereto. The non-display area NDA may be disposed adjacent to the display area DA to surround the display area DA, and may not display an image.

The display driver 200 may output signals and voltages for driving the first to third pixels SP1, SP2, and SP3. The display driver 200 may supply data voltages to data lines of the display panel 100. The data voltages may be supplied to the first to third pixels SP1, SP2, and SP3, and may determine luminance of the first to third pixels SP1, SP2, and SP3. The display driver 200 may supply a source voltage to a power line of the display panel 100, and may supply a gate control signal to a gate driver of the display panel 100. For example, the display driver 200 may be formed as an integrated circuit (IC) and may be mounted in a chip on film manner or a tape carrier package manner, but is not limited thereto.

The viewing distance detector 300 may detect a viewing distance VD from the user. The viewing distance detector 300 may include an eye tracker to track user's eyes, thereby detecting a position of the user. The viewing distance detector 300 may detect the viewing distance VD between the tiled display device TD and the user by performing a foveated rendering based on the position of the user. A method of detecting the position of the user and a method of detecting the viewing distance VD are not limited to those described above. The viewing distance detector 300 may supply the detected viewing distance VD to the luminance compensator 500.

The illuminance detector 400 may detect illuminance IL adjacent to the tiled display device TD. The illuminance detector 400 may include at least one illuminance sensor to detect illuminance IL of the display area DA and the coupling area SM of the tiled display device TD. In case that the illuminance IL is high, reflectivity of the coupling area SM may increase, and in case that the illumination IL is low, the reflectivity of the coupling area SM may decrease. The illuminance detector 400 may supply the detected illuminance IL to the luminance compensator 500.

The luminance compensator 500 may receive the size BAS of the coupling area SM, the viewing distance VD, and the illuminance IL. The size BAS of the coupling area SM may be calculated by comparing the coupling pitch CP and the pixel pitch PP with each other after the display devices 10 are connected to each other. For example, the coupling pitch CP may correspond to a pitch between a unit pixel UP disposed on the right side of a first display device 10-1 and a unit pixel UP disposed on the left side of a second display device 10-2, and the pixel pitch PP may correspond to a pitch between adjacent unit pixels UP of the second display device 10-2. Accordingly, as the coupling pitch CP becomes greater than the pixel pitch PP, the size BAS of the coupling area SM may increase. The size BAS of the coupling area SM may be measured and stored in a memory after the display devices 10 are connected to each other, and the luminance compensator 500 may receive the size BAS of the coupling area SM in a luminance compensation process.

The luminance compensator 500 may increase a luminance compensation amount LCA of the unit pixels UP adjacent to the coupling area SM as the coupling pitch CP becomes greater than the pixel pitch PP, and decrease the luminance compensation amount LCA as the coupling pitch CP becomes smaller than the pixel pitch PP. The luminance compensator 500 may not compensate the luminance of the unit pixels UP adjacent to the coupling area SM in case that the coupling pitch CP and the pixel pitch PP are the same as each other. Accordingly, the luminance compensator 500 may end the luminance compensation process in case that the coupling pitch CP and the pixel pitch PP are the same as each other.

The luminance compensator 500 may decrease the luminance compensation amount LCA of the unit pixels UP adjacent to the coupling area SM as the illuminance IL increases. In case that the illuminance IL is high, the reflectivity of the coupling area SM may increase. The reflectivity of the coupling area SM may have the same effect as the luminance compensation amount LCA of the unit pixels UP. Accordingly, the luminance compensator 500 may decrease the luminance compensation amount LCA of the unit pixels UP adjacent to the coupling area SM as the reflectivity of the coupling area SM increases.

The luminance compensator 500 may compensate the luminance of the unit pixels UP adjacent to the coupling area SM based on the size BAS of the coupling area SM, the viewing distance VD, and the illuminance IL. For example, the luminance compensator 500 may calculate a visibility index through a simulation of a human vision system (HVS) based on the size BAS of the coupling area SM, the viewing distance VD, and the illuminance IL. The human vision system HVS may indicate a degree of which the coupling area SM is recognized by the user based on the size BAS of the coupling area SM, the viewing distance VD, and the illuminance IL by the visibility index. The human vision system (HVS) may use a characteristic function of the user's eyes or a characteristic function of the tiled display device TD. The human vision system (HVS) may use at least one of a phase transfer function, a modulation transfer function, a light transfer function, a line spread function, a pupil function, and a point spread function as the characteristic function. A unit of the visibility index may be a just noticeable difference (JND).

In another embodiment, the luminance compensator 500 may compensate the luminance of the unit pixels UP adjacent to the coupling area SM based on the size BAS of the coupling area SM and the viewing distance VD in case that the illuminance IL is in a predetermined (or selectable) level or less. The luminance compensator 500 may recognize that the reflectivity of the coupling area SM is 0 in case that the illuminance IL is in the predetermined (or selectable) level or less. Accordingly, the luminance compensator 500 may determine the luminance compensation amount LCA based on the size BAS of the coupling area SM and the viewing distance VD with an exception that the illuminance IL is in the predetermined (or selectable) level or less.

The luminance compensator 500 may calculate the visibility index based on the size BAS of the coupling area SM, the viewing distance VD, and the illuminance IL, and may determine a luminance compensation amount LCA for optimizing the visibility index. The luminance compensator 500 may adjust luminance adjacent to the coupling area SM to an average luminance level of the display area DA by compensating the luminance of the unit pixels UP adjacent to the coupling area SM. The luminance compensator 500 may decrease the visibility index by determining an optimal luminance compensation amount LCA. As the visibility index becomes lower, the coupling area SM may become harder to be recognized by the user, and a sense of discontinuity between the display devices 10 may be reduced to improve a degree of immersion of the image. The luminance compensation amount LCA may correspond to a compensation value added to an existing data voltage in order to minimize the visibility index.

The luminance compensator 500 may compensate the luminance of unit pixels UP disposed in a column or a row most adjacent to the coupling area SM. Referring to FIG. 1, the luminance compensator 500 may compensate the luminance of the unit pixels UP disposed in the rightmost column and the lowermost row of the first display device 10-1. The luminance compensator 500 may compensate the luminance of unit pixels UP disposed in the leftmost column and the lowermost row of the second display device 10-2. The luminance compensator 500 may compensate the luminance of unit pixels UP disposed in the rightmost column and the uppermost row of the third display device 10-3. The luminance compensator 500 may compensate the luminance of unit pixels UP disposed in the leftmost column and the uppermost row of the fourth display device 10-4. For example, the luminance compensator 500 may increase the number of unit pixels UP of which the luminance is to be compensated for as the luminance compensation amount LCA increases. The luminance compensator 500 may compensate the luminance of unit pixels UP disposed in at least one column or at least one row adjacent to the coupling area SM.

In case that the luminance compensation amount LCA has a specific value, the luminance compensator 500 may calculate a visibility index that changes depending on the viewing distance VD and may decide a range of the viewing distance VD in which the visibility index satisfies a reference index. Here, the reference index may define a degree of which the coupling area SM is not recognized by the user. For example, in case that the luminance compensation amount LCA is 1%, the luminance compensator 500 may calculate a visibility index that changes depending on the size BAS of the coupling area SM, the viewing distance VD, and the illuminance IL, and may decide a range of the size BAS of the coupling area SM, the viewing distance VD, and/or the illuminance IL in which the visibility index satisfies a reference index. The size BAS of the coupling area SM may be measured after the tiled display device TD is manufactured. A magnitude of the illuminance IL may be measured in real time or at a specific time. Accordingly, the luminance compensator 500 may determine the luminance compensation amount LCA based on a selection of the user within the range of the viewing distance VD in which the visibility index satisfies the reference index based on the measured size BAS of the coupling area SM and the illuminance IL.

The luminance compensator 500 may provide the determined luminance compensation amount LCA to the display driver 200. The display driver 200 may generate compensation data DATA to be added to an existing data voltage based on the luminance compensation amount LCA. The display driver 200 may generate the compensation data DATA by adjusting the existing data voltage by a ratio of the luminance compensation amount LCA. The display driver 200 may transmit the compensation data DATA to the unit pixels UP adjacent to the coupling area SM of the display panel 100.

Figure 7:
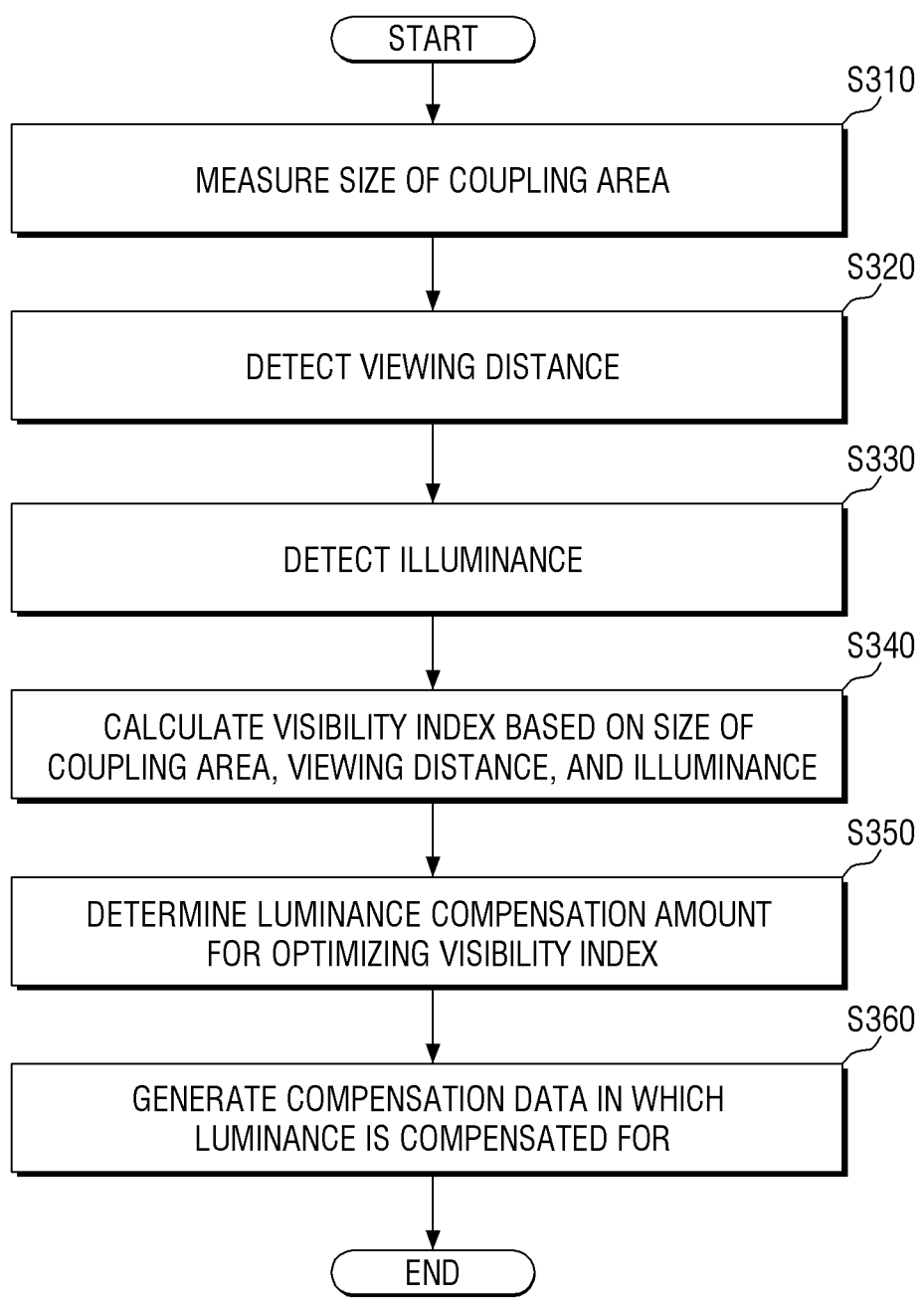
FIG. 7 is a flowchart illustrating a luminance compensation process of the tiled display device according to another embodiment.

FIG. 7 is a flowchart illustrating a luminance compensation process of the tiled display device according to another embodiment.

Referring to FIG. 7, the size BAS of the coupling area SM may be calculated by comparing the coupling pitch CP and the pixel pitch PP with each other after the display devices 10 are connected to each other (S310). The size BAS of the coupling area SM may be measured and stored in the memory after the display devices 10 are connected to each other.

The viewing distance detector 300 may detect the viewing distance VD from the user (S320). The viewing distance detector 300 may include the eye tracker to track the user's eyes, thereby detecting the position of the user. The viewing distance detector 300 may detect the viewing distance VD between the tiled display device TD and the user by performing the foveated rendering based on the position of the user.

The illuminance detector 400 may detect the illuminance IL adjacent to the tiled display device TD (S330). The illuminance detector 400 may include at least one illuminance sensor to detect the illuminance IL of the display area DA and the coupling area SM of the tiled display device TD.

The luminance compensator 500 may calculate the visibility index based on the size BAS of the coupling area SM, the viewing distance VD, and the illuminance IL (S340). For example, the luminance compensator 500 may calculate the visibility index through the simulation of the human vision system (HVS) based on the size BAS of the coupling area SM, the viewing distance VD, and the illuminance IL. The human vision system (HVS) may use the characteristic function of the user's eyes or the characteristic function of the tiled display device TD. Here, the human vision system (HVS) may use at least one of the phase transfer function, the modulation transfer function, the light transfer function, the line spread function, the pupil function, and the point spread function as the characteristic function.

The luminance compensator 500 may determine the luminance compensation amount LCA for optimizing the visibility index (S350). The luminance compensator 500 may compensate the luminance of the unit pixels UP disposed in at least one column or at least one row adjacent to the coupling area SM. The luminance compensator 500 may adjust the luminance adjacent to the coupling area SM to the average luminance level of the display area DA by compensating the luminance of the unit pixels UP adjacent to the coupling area SM.

The luminance compensator 500 may provide the determined luminance compensation amount LCA to the display driver 200. The display driver 200 may generate the compensation data DATA to be added to the existing data voltage based on the luminance compensation amount LCA (S360). The display driver 200 may transmit the compensation data DATA to the unit pixels UP adjacent to the coupling area SM of the display panel 100.

Figure 8:
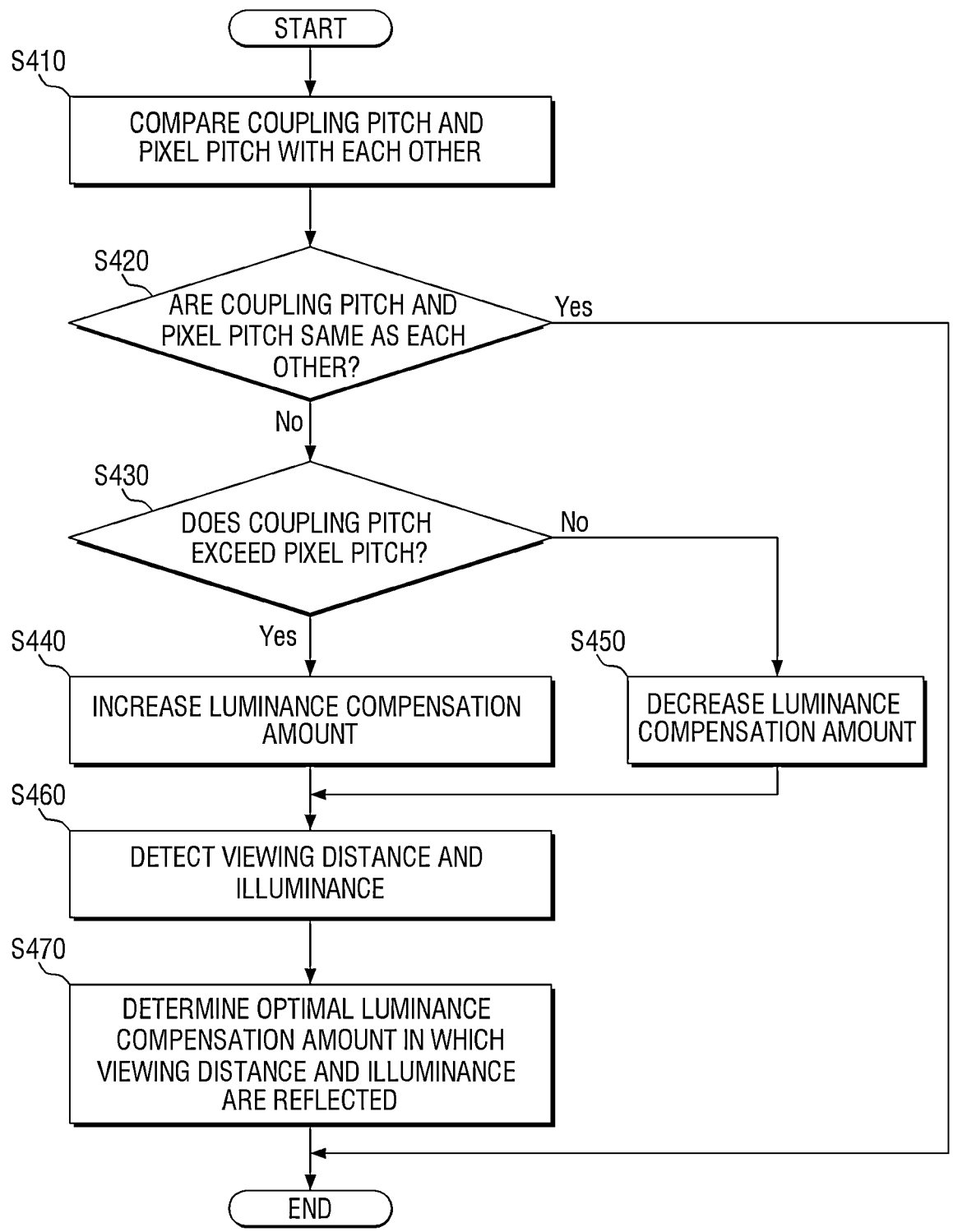
FIG. 8 is a flowchart illustrating a luminance compensation process of the tiled display device according to another embodiment.

FIG. 8 is a flowchart illustrating a luminance compensation process of the tiled display device according to another embodiment.

Referring to FIG. 8, the size BAS of the coupling area SM may be calculated by comparing the coupling pitch CP and the pixel pitch PP with each other after the display devices 10 are connected to each other (S410).

In case that the coupling pitch CP and the pixel pitch PP are the same as each other (S420), the luminance compensator 500 may not compensate the luminance of the unit pixels UP adjacent to the coupling area SM. Accordingly, the luminance compensator 500 may end the luminance compensation process in case that the coupling pitch CP and the pixel pitch PP are the same as each other.

In case that the coupling pitch CP is greater than the pixel pitch PP (S430), the luminance compensator 500 may increase the luminance compensation amount LCA of the unit pixels UP adjacent to the coupling area SM (S440).

In case that the coupling pitch CP is less than the pixel pitch PP, the luminance compensator 500 may decrease the luminance compensation amount LCA (S450).

The viewing distance detector 300 may detect the viewing distance VD from the user, and the illuminance detector 400 may detect the illuminance IL adjacent to the tiled display device TD (S460).

The luminance compensator 500 may determine an optimal luminance compensation amount LCA in which the viewing distance VD and the illuminance IL are reflected (S470). The luminance compensator 500 may compensate the luminance of the unit pixels UP disposed in at least one column or at least one row adjacent to the coupling area SM. The luminance compensator 500 may adjust the luminance adjacent to the coupling area SM to the average luminance level of the display area DA by compensating the luminance of the unit pixels UP adjacent to the coupling area SM. The luminance compensator 500 may provide the determined luminance compensation amount LCA to the display driver 200. The display driver 200 may generate the compensation data DATA to be added to the existing data voltage based on the luminance compensation amount LCA.

Figure 9:
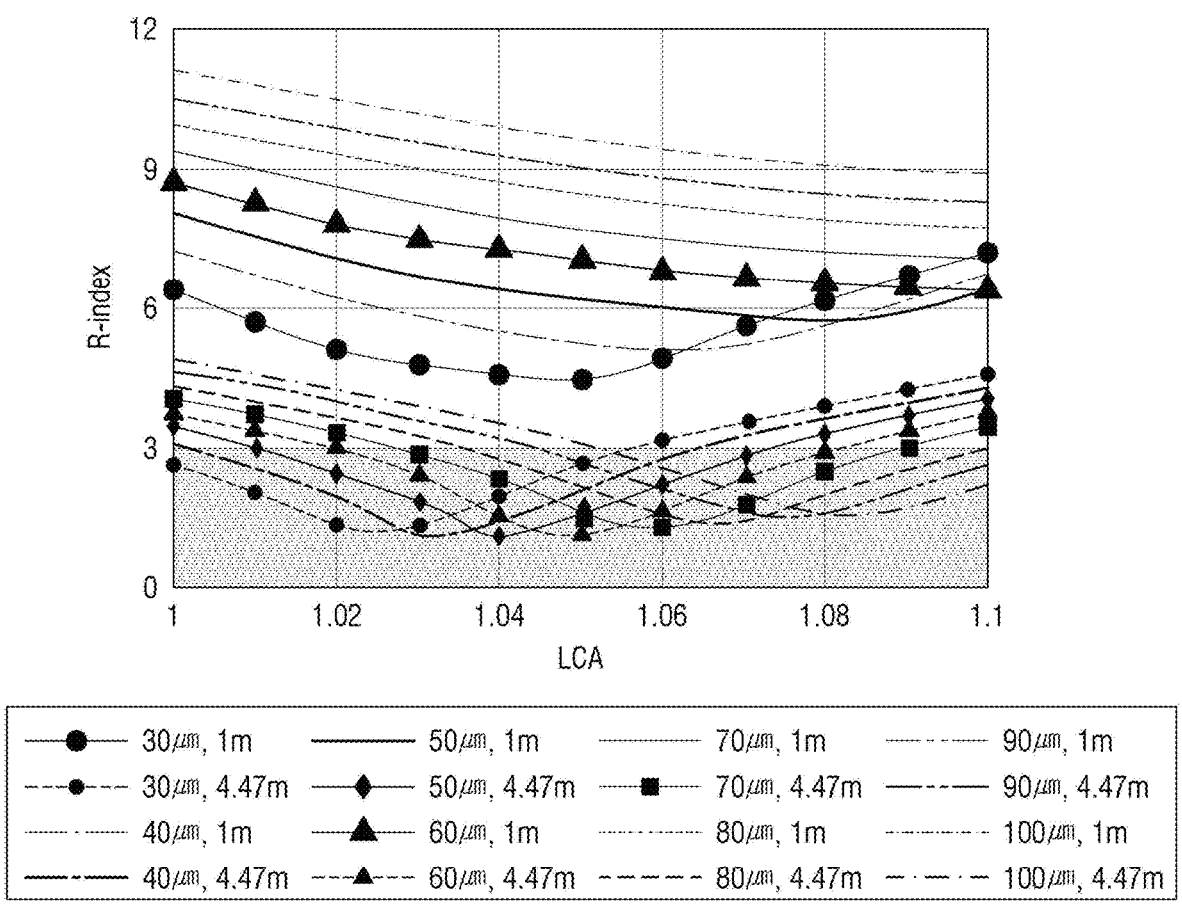
FIG. 9 is a graph illustrating a visibility index based on a size of a coupling area, a viewing distance, and a luminance compensation amount in the tiled display device according to an embodiment.

FIG. 9 is a graph illustrating a visibility index based on a size of a coupling area, a viewing distance, and a luminance compensation amount in the tiled display device according to an embodiment. FIG. 9 illustrates a visibility index R-index in case that the size BAS of the coupling area SM is 30 to 100 the viewing distance VD is 1 or 4.47 m, and the luminance compensation amount LCA is 1 to 1.1.

Referring to FIG. 9, the luminance compensator 500 may calculate a visibility index R-index through a simulation of a human vision system (HVS) based on the size BAS of the coupling area SM, the viewing distance VD, and a luminance compensation amount.

For example, the luminance compensator 500 may calculate a visibility index R-index as represented in Table 1 through the simulation of the human vision system (HVS).

TABLE 1

| | | Size BAS μm of Coupling Area SM | | | | | | | |
|---|---|---|---|---|---|---|---|---|---|
| | | 30 | 40 | 50 | 60 | 70 | 80 | 90 | 100 |
| Luminance Compensation Amount LCA | 1 | 6.3 | 7.2 | 8.0 | 8.7 | 9.4 | 10.0 | 10.5 | 11.0 |
| | 1.01 | 5.7 | 6.7 | 7.6 | 8.3 | 9.0 | 9.6 | 10.2 | 10.8 |
| | 1.02 | 5.1 | 6.1 | 7.1 | 7.9 | 8.6 | 9.3 | 9.9 | 10.5 |
| | 1.03 | 4.7 | 5.7 | 6.7 | 7.5 | 8.2 | 8.9 | 9.6 | 10.2 |
| | 1.04 | 4.5 | 5.5 | 6.3 | 7.2 | 7.9 | 8.6 | 9.2 | 9.8 |
| | 1.05 | 4.3 | 5.3 | 6.1 | 6.9 | 7.7 | 8.3 | 9.0 | 9.6 |
| | 1.06 | 4.9 | 5.1 | 6.0 | 6.7 | 7.5 | 8.1 | 8.8 | 9.4 |
| | 1.07 | 5.6 | 5.1 | 5.8 | 6.6 | 7.3 | 8.0 | 8.6 | 9.2 |
| | 1.08 | 6.1 | 5.7 | 5.7 | 6.5 | 7.2 | 7.9 | 8.5 | 9.1 |
| | 1.09 | 6.7 | 6.2 | 5.8 | 6.4 | 7.1 | 7.8 | 8.4 | 9.0 |
| | 1.1 | 7.2 | 6.8 | 6.4 | 6.3 | 7.0 | 7.7 | 8.3 | 8.9 |

In Table 1, a viewing distance between the tiled display device TD and the user may be 1 m. The luminance compensation amount LCA may correspond to a compensation value added to an existing data voltage in order to minimize the visibility index R-index. For example, in case that the luminance compensation amount LCA is 1.01, a data voltage of 1% may be added to the existing data voltage, and in case that the luminance compensation amount LCA is 1.1, a data voltage of 10% may be added to the existing data voltage. A unit of the visibility index R-index may be a just noticeable difference (JND).

The luminance compensator 500 may decrease the visibility index by determining an optimal luminance compensation amount LCA. As the visibility index becomes lower, the coupling area SM may be prevented from being recognized by the user, and a sense of discontinuity between the display devices 10 may be removed to improve a degree of immersion of the image.

Figure 10:
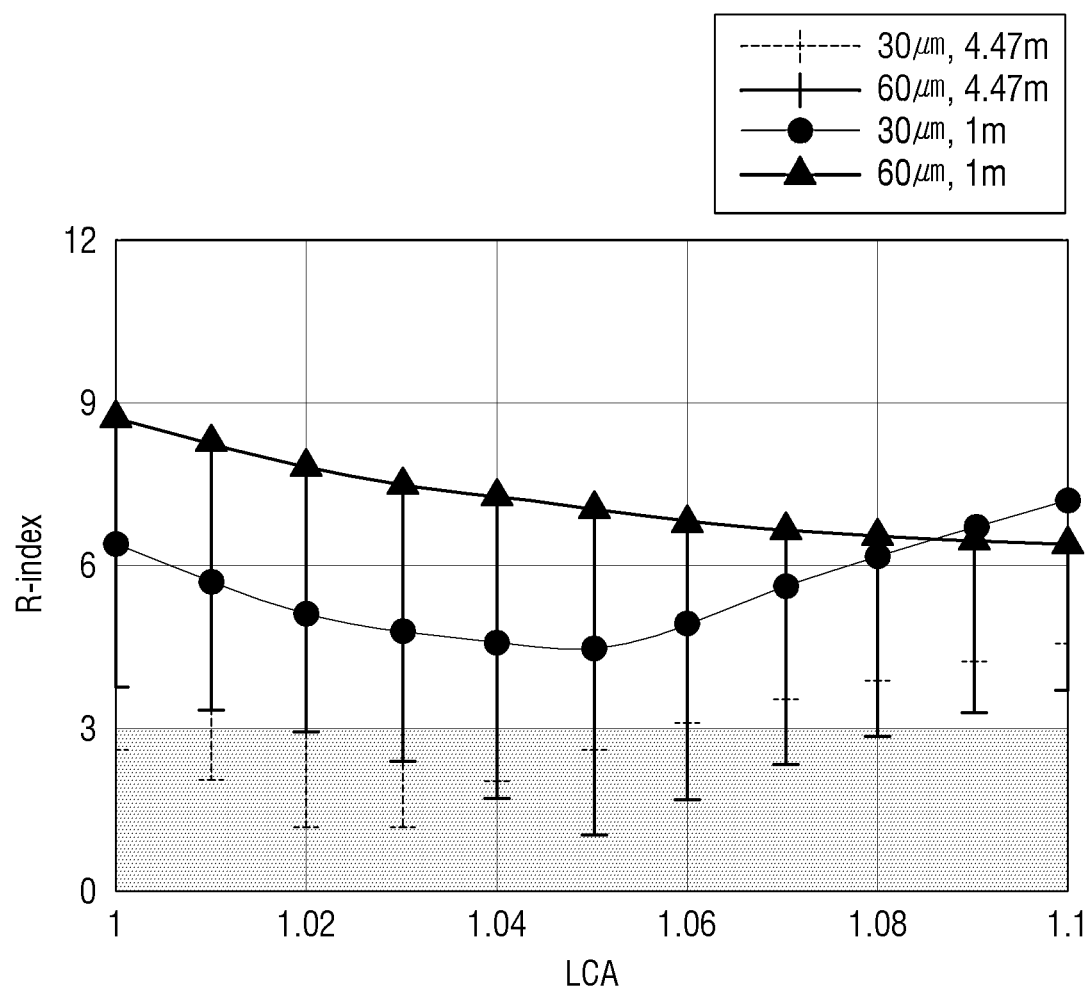
FIG. 10 is a graph illustrating a range of a viewing distance at a specific luminance compensation amount in the tiled display device according to an embodiment.

FIG. 10 is a graph illustrating a range of a viewing distance at a specific luminance compensation amount in the tiled display device according to an embodiment. FIG. 10 illustrates a visibility index R-index in case that the size BAS of the coupling area SM is 30 or 60 μm, the viewing distance VD is 1 to 4.47 m, and the luminance compensation amount LCA is 1 to 1.1.

Referring to FIG. 10, in case that the luminance compensation amount LCA has a specific value, the luminance compensator 500 may calculate a visibility index R-index that changes depending on the viewing distance VD and may decide a range of the viewing distance VD in which the visibility index R-index satisfies a reference index. The reference index may define a degree of which the coupling area SM is not recognized by the user. For example, the reference index may be about 3 JND. Accordingly, in case that the luminance compensation amount LCA has a specific value, the luminance compensator 500 may calculate a visibility index R-index that changes depending on the viewing distance VD and may decide a range of the viewing distance VD in which the visibility index R-index is about 3 JND or less.

For example, in case that the luminance compensation amount LCA is 1.02, the size BAS of the coupling area SM is 30 μm, and the viewing distance VD is 1 to 4.47 m, the visibility index R-index may have a value of about 1.3 to 5. In case that the luminance compensation amount LCA is 1.04, the size BAS of the coupling area SM is 30 μm, and the viewing distance VD is 1 to 4.47 m, the visibility index R-index may have a value of about 2 to 4.5. In case that the luminance compensation amount LCA is 1.05, the size BAS of the coupling area SM is 60 μm, and the viewing distance VD is 1 to 4.47 m, the visibility index R-index may have a value of about 1 to 7. As such, the luminance compensator 500 may decide a range of the viewing distance VD in which the visibility index R-index is 3 JND or less. Accordingly, the luminance compensator 500 may determine the luminance compensation amount LCA based one a selection of the user within the range of the viewing distance VD in which the visibility index R-index satisfies the reference index based on the size BAS of the coupling area SM.

FIGS. 11 to 14 are graphs illustrating luminance before compensation and compensated luminance according to a size of a coupling area and a viewing distance in the tiled display device according to an embodiment.

Referring to FIGS. 11 to 14, the tiled display device TD may include multiple display devices 10 and coupling areas SM. Referring to FIG. 1, the tiled display device TD may include the first to fourth display devices 10-1 to 10-4 and the coupling areas SM. The display area DA of each of the first to fourth display devices 10-1 to 10-4 may have luminance according to the data voltage, but the coupling area SM does not include the unit pixels UP, and may thus have luminance lower than that of the display area DA.

Figure 11:
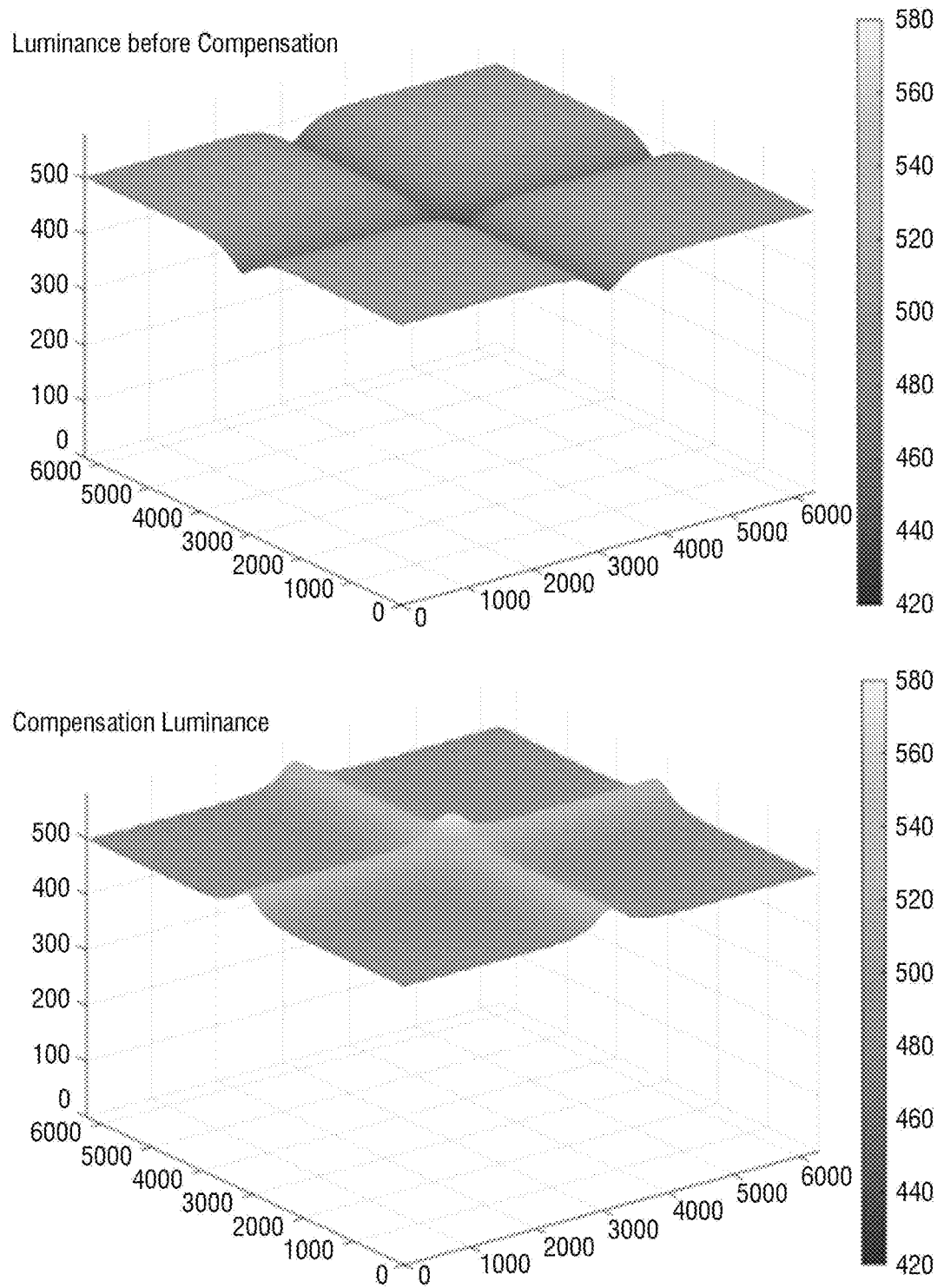

In FIG. 11, the size BAS of the coupling area SM of the tiled display device TD may be 30 μm, and the viewing distance VD may be 1 m. A difference in luminance between the display area DA and the coupling area SM may be about 40 or more. Accordingly, the luminance compensator 500 may adjust the luminance adjacent to the coupling area SM to the average luminance level of the display area DA by compensating the luminance of the unit pixels UP adjacent to the coupling area SM.

In FIG. 12, the size BAS of the coupling area SM of the tiled display device TD may be 30 μm, and the viewing distance VD may be 4.47 m. A difference in luminance between the display area DA and the coupling area SM may be about 20 or less. As the viewing distance VD of FIG. 12 increases compared to the viewing distance VD of FIG. 11, the difference in luminance between the display area DA and the coupling area SM in FIG. 12 may be relatively smaller than the difference in the luminance between the display area DA and the coupling area SM in FIG. 11. Accordingly, a luminance compensation amount LCA of the tiled display device TD of FIG. 12 may be relatively smaller than a luminance compensation amount LCA of the tiled display device TD of FIG. 11.

In FIG. 13, the size BAS of the coupling area SM of the tiled display device TD may be 80 μm, and the viewing distance VD may be 1 m. A difference in luminance between the display area DA and the coupling area SM may be about 100 or more. As the size BAS of the coupling area SM of FIG. 13 increases compared to the size BAS of the coupling area SM of FIG. 11, the difference in luminance between the display area DA and the coupling area SM in FIG. 13 may be relatively greater than the difference in the luminance between the display area DA and the coupling area SM in FIG. 11. Accordingly, a luminance compensation amount LCA of the tiled display device TD of FIG. 13 may be relatively greater than a luminance compensation amount LCA of the tiled display device TD of FIG. 11.

Figure 14:
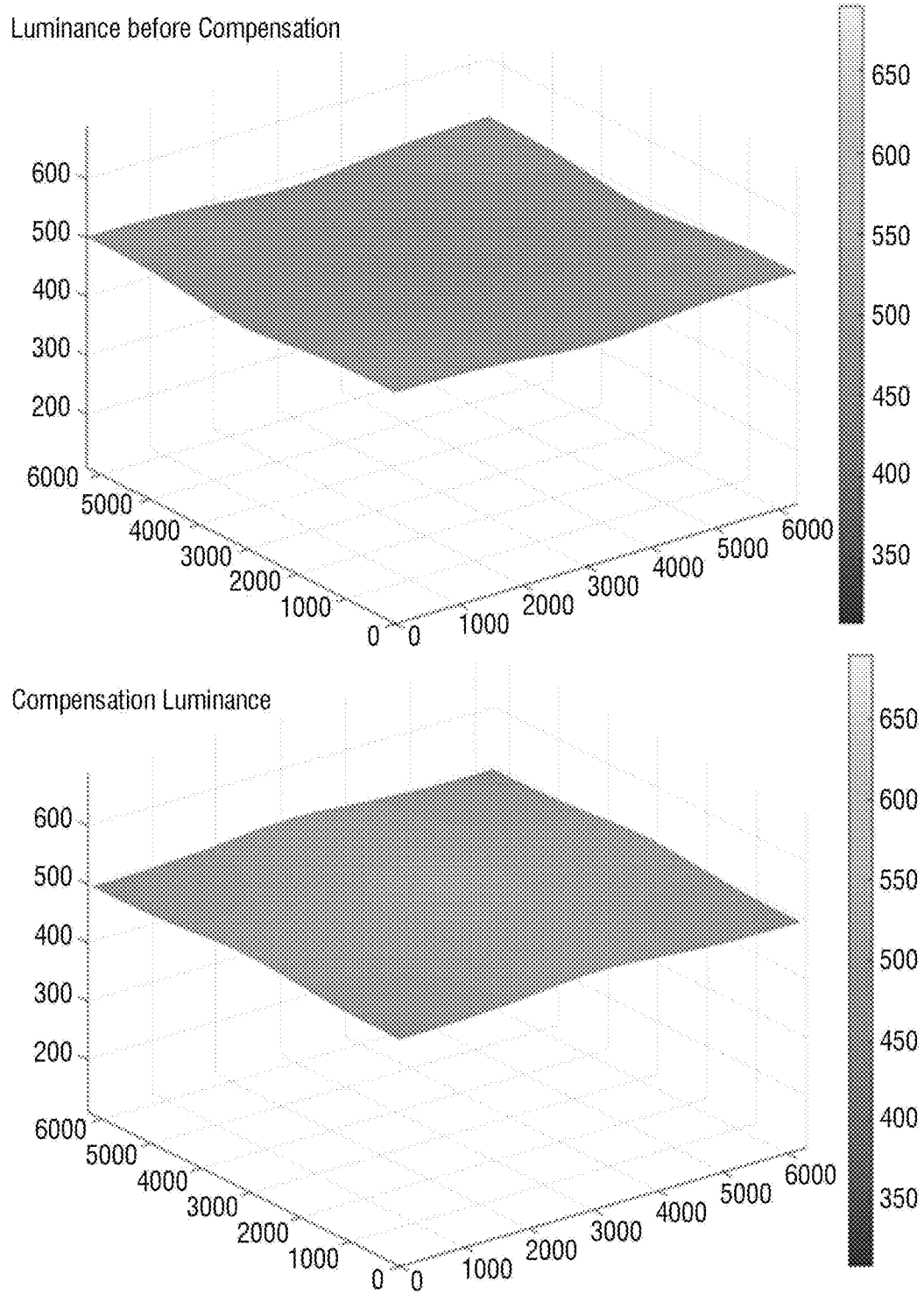

In FIG. 14, the size BAS of the coupling area SM of the tiled display device TD may be 80 μm, and the viewing distance VD may be 4.47 m. A difference in luminance between the display area DA and the coupling area SM may be about 20 or less. As the viewing distance VD of FIG. 14 increases compared to the viewing distance VD of FIG. 13, the difference in luminance between the display area DA and the coupling area SM in FIG. 14 may be relatively smaller than the difference in the luminance between the display area DA and the coupling area SM in FIG. 13. Accordingly, a luminance compensation amount LCA of the tiled display device TD of FIG. 14 may be relatively smaller than a luminance compensation amount LCA of the tiled display device TD of FIG. 13.

The above description is an example of technical features of the disclosure, and those skilled in the art to which the disclosure pertains will be able to make various modifications and variations. Thus, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A tiled display device comprising:
a first display device and a second display device, the first display device and the second display device each including a display area including pixels and a non-display area adjacent to the display area;
a coupling area disposed between the first display device and the second display device;
a viewing distance detector detecting a viewing distance between the tiled display device and a user; and
a luminance compensator that compensates luminance of the pixels adjacent to the coupling area based on a size of the coupling area and the viewing distance, wherein
the luminance compensator calculates a visibility index based on the size of the coupling area and the viewing distance, and
the luminance compensator determines a luminance compensation amount for optimizing the visibility index relative to a reference index at which the coupling area is not recognized by the user,
in case that the luminance compensation amount has a specific value, the luminance compensator calculates a visibility index that changes depending on the viewing distance,
the luminance compensator determines a range of the viewing distance in which the visibility index satisfies the reference index, the luminance compensator determines the luminance compensation amount based on a selection of the user within the range of the viewing distance in which the visibility index satisfies the reference index, and
the luminance compensator increases a number of the pixels of which the luminance is to be compensated in case that a luminance compensation amount increases.

2. The tiled display device of claim 1, wherein
the size of the coupling area is determined by comparing a coupling pitch and a pixel pitch,
the coupling pitch is a pitch between a pixel of the first display device adjacent to the coupling area and a pixel of the second display device adjacent to the coupling area, and
the pixel pitch is a pitch between adjacent ones of the pixels in the second display device.

3. The tiled display device of claim 2, wherein
an increment in a luminance compensation amount of the pixels adjacent to the coupling area is determined based on a difference between the coupling pitch and the pixel pitch in case that the coupling pitch is greater than the pixel pitch, and
a decrement in the luminance compensation amount of the pixels adjacent to the coupling area is determined based on a difference between the pixel pitch and the coupling pitch in case that the coupling pitch is smaller than the pixel pitch.

4. The tiled display device of claim 2, wherein the luminance compensator does not compensate the pixels adjacent to the coupling area in case that the coupling pitch and the pixel pitch are substantially equal to each other.

5. The tiled display device of claim 1, wherein the viewing distance detector detects the viewing distance by performing a foveated rendering based on a position of the user.

6. A tiled display device comprising: a first display device and a second display device, each including a display area including pixels and a non-display area adjacent to the display area; a coupling area disposed between the first display device and the second display device; a viewing distance detector detecting a viewing distance between the tiled display device and a user; an illuminance detector detecting illuminance of the coupling area; and a luminance compensator that compensates luminance of the pixels adjacent to the coupling area based on a size of the coupling area, the viewing distance, and the illuminance, wherein the luminance compensator calculates a visibility index based on the size of the coupling area, the viewing distance, and the illuminance, the luminance compensator determines a luminance compensation amount for optimizing the visibility index relative to a reference index at which the coupling area is not recognized by the user, in case that each of the luminance compensation amount and the illuminance has a specific value, the luminance compensator calculates a visibility index that changes depending on the viewing distance, the luminance compensator determines a range of the viewing distance in which the visibility index satisfies the reference index, the size of the coupling area is determined by comparing a coupling pitch and a pixel pitch, the coupling pitch is a pitch between a pixel of the first display device adjacent to the coupling area and a pixel of the second display device adjacent to the coupling area, the pixel pitch is a pitch between adjacent ones of the pixels in the second display device, an increment in a luminance compensation amount of the pixels adjacent to the coupling area is determined based on a difference between the coupling pitch and the pixel pitch in case that the coupling pitch is greater than the pixel pitch, a decrement in the luminance compensation amount of the pixels adjacent to the coupling area is determined based on a difference between the pixel pitch and the coupling pitch in case that the coupling pitch is smaller than the pixel pitch, and the luminance compensator does not compensate the pixels adjacent to the coupling area in case that the coupling pitch and the pixel pitch are substantially equal to each other.

7. The tiled display device of claim 6, wherein the luminance compensator determines the luminance compensation amount based on a selection of the user within the range of the viewing distance in which the visibility index satisfies the reference index.

8. The tiled display device of claim 6, wherein the luminance compensator decreases a luminance compensation amount of the pixels adjacent to the coupling area in case that the illuminance increases.

9. The tiled display device of claim 6, wherein the luminance compensator compensates the luminance of the pixels adjacent to the coupling area based on the size of the coupling area and the viewing distance in case that the illuminance is equal to or less than a level.

10. The tiled display device of claim 6, wherein the luminance compensator increases a number of the pixels of which the luminance is to be compensated in case that a luminance compensation amount increases.

11. The tiled display device of claim 6, wherein the viewing distance detector detects the viewing distance by performing a foveated rendering based on a position of the user.

* * * * *